(12) United States Patent
Schulz et al.

(10) Patent No.: US 10,320,255 B2
(45) Date of Patent: Jun. 11, 2019

(54) WAVE WINDING HAVING A LOW COGGING TORQUE, STATOR AND ELECTRIC MACHINE COMPRISING A WAVE WINDING OF SAID TYPE

(71) Applicant: VOLKSWAGEN AKTIENGESELLSCHAFT, Wolfsburg (DE)

(72) Inventors: Winfried Schulz, Elze/Leine (DE); Hauke Einfeld, Kassel (DE)

(73) Assignee: Volkswagen AG, Wolfsburg (DE)

( * ) Notice: Subject to any disclaimer, the term of this patent is extended or adjusted under 35 U.S.C. 154(b) by 203 days.

(21) Appl. No.: 15/526,356

(22) PCT Filed: Nov. 12, 2015

(86) PCT No.: PCT/EP2015/076387
§ 371 (c)(1),
(2) Date: May 12, 2017

(87) PCT Pub. No.: WO2016/075215
PCT Pub. Date: May 19, 2016

(65) Prior Publication Data
US 2017/0324294 A1 Nov. 9, 2017

(30) Foreign Application Priority Data
Nov. 13, 2014 (DE) .................. 10 2014 223 202

(51) Int. Cl.
*H02K 3/04* (2006.01)
*H02K 3/28* (2006.01)
(Continued)

(52) U.S. Cl.
CPC ............... *H02K 3/28* (2013.01); *H02K 3/14* (2013.01); *H02K 29/03* (2013.01); *H02K 23/32* (2013.01)

(58) Field of Classification Search
CPC ............ H02K 3/28; H02K 3/14; H02K 29/03; H02K 23/32
(Continued)

(56) References Cited

U.S. PATENT DOCUMENTS 3,621,311 A * 11/1971 Von Starck .......... H02K 41/025
310/13
5,898,251 A 4/1999 Mochizuki et al.
(Continued)

FOREIGN PATENT DOCUMENTS

CN 1499694 A 5/2004
CN 101151782 A 3/2008
(Continued)

*Primary Examiner* — Thanh Lam
(74) *Attorney, Agent, or Firm* — Laurence A. Greenberg; Werner H. Stemer; Ralph E. Locher

(57) ABSTRACT

A wave winding for a stator of an electric machine is configured to be placed in a series of stator grooves located along a periphery of the machine to increase power and efficiency of the machine by avoiding losses, particularly during upper rotational speed range operation. The wave winding has at least two conductors for one respective phase of the machine. The conductors are interconnected in parallel and/or series and can be disposed at a given winding pitch in a number of at least two successive stator grooves of each magnetic pole and each phase of the machine in a sequence predefined for each phase and for one respective magnetic pole along the periphery of the machine. The predefined sequence at least of the conductors interconnected in parallel is transposed by at least one groove skip in at least one position along the periphery of the machine.

13 Claims, 6 Drawing Sheets

(51) Int. Cl.
*H02K 29/03* (2006.01)
*H02K 3/14* (2006.01)
*H02K 23/32* (2006.01)

(58) Field of Classification Search
USPC ............... 310/179–180, 201–203, 206–207
See application file for complete search history.

(56) References Cited

U.S. PATENT DOCUMENTS

| | | | |
|---|---|---|---|
| 6,376,961 B2* | 4/2002 | Murakami | H02K 3/14 310/179 |
| 7,005,772 B1 | 2/2006 | Frederick et al. | |
| 7,034,428 B2 | 4/2006 | Cai et al. | |
| 7,091,644 B2* | 8/2006 | Fukushima | H02K 3/28 310/179 |
| 7,242,124 B2 | 7/2007 | Ogawa et al. | |
| 7,830,060 B2* | 11/2010 | Miyata | H02K 3/28 310/179 |
| 9,455,605 B2 | 9/2016 | Saito et al. | |
| 2001/0038251 A1* | 11/2001 | Nakamura | H02K 3/28 310/180 |
| 2002/0096958 A1 | 7/2002 | Oohashi et al. | |
| 2003/0214196 A1 | 11/2003 | Cai et al. | |
| 2008/0211322 A1 | 9/2008 | Heinrich et al. | |
| 2009/0261683 A1* | 10/2009 | Sadiku | H02K 3/12 310/207 |
| 2012/0181886 A1* | 7/2012 | Osada | H02K 3/14 310/71 |
| 2013/0015742 A1 | 1/2013 | Inoue et al. | |
| 2015/0054374 A1 | 2/2015 | Neet | |

FOREIGN PATENT DOCUMENTS

| | | |
|---|---|---|
| CN | 102882338 A | 1/2013 |
| CN | 103053097 A | 4/2013 |
| CN | 104426257 A | 3/2015 |
| DE | 10321956 A1 | 3/2004 |
| DE | 10326095 A1 | 4/2004 |
| DE | 102004042768 A1 | 3/2006 |
| DE | 60125436 T2 | 10/2007 |
| EP | 1643619 A2 | 4/2006 |
| EP | 2597754 A1 | 5/2013 |
| JP | 108182238 A | 7/1996 |

* cited by examiner

WAVE WINDING HAVING A LOW COGGING TORQUE, STATOR AND ELECTRIC MACHINE COMPRISING A WAVE WINDING OF SAID TYPE

BACKGROUND OF THE INVENTION

Field of the Invention

The invention relates to a wave winding for a stator of an electric machine. The invention further relates to a stator of an electric machine. In addition, the invention relates to an electric machine.

Description of the Related Art

Known from printed publication DE 103 21 956 A1 are windings consisting of rectangular copper hairpins in several sets for an electric machine that exhibits a stator with several partly closed stator slots. In order to simplify production and to keep the slot-filling ratio of windings high, preformed rectangular wires with straight conductor segments are created which are arranged in the stator slots. For the purpose of producing the windings from rectangular copper hairpins, firstly the rectangular copper wire is cut into elements. In this case there are also two elements with shorter winding pitches (one slot shorter, compared with the others) per phase per winding set if the windings are connected in wave windings. Depending on the winding-pitch requirements, the rectangular wires are bent into U-shapes, and the copper hairpins are produced as a result. So-called "hairpin windings" are designated by the term "copper hairpins". In this case, short winding pieces on one side of the stator are connected by welding, and in this way a continuous winding is generated. It is virtually a question of a constructed wave winding and not of a wave winding wound at least partly in uninterrupted manner.

Printed publication JP 8-182238 A presents a three-phase wave winding with three winding packets or winding strands for an electric machine. In a so-called "twisted portion", winding heads of the winding packets or winding strands have each been twisted in themselves but guided with unchanged winding pitch.

A method for producing a lap winding for a dynamo-electric machine is known from U.S. Pat. No. 5,898,251 A. In a concentrically wound double-layer armature winding for the dynamo-electric machine the number of grooves per phase and pole is assumed to be q. The armature winding comprises a winding that corresponds to a pole and that includes a plurality of coils with winding pitches differing from one another. The coils include at least one coil having a number of turns that differs from those of the other coils. The number q of grooves per phase and pole amounts to at least q=3. The number of coils in a winding has been set to (q−n), where the number n takes the values n=1, 2, . . . q−2. The coils have been distributed in the grooves in such a manner that a concentrically wound double-layer winding with a sinusoidal distribution of magnetic force is formed. In a further arrangement, the number of pole windings per phase is half as large as the number of poles in a concentrically wound double-layer winding or in a lap winding. The number of coils in one of the pole windings is set to (2x(q−n)).

In order to satisfy certain requirements as regards torque and power with an electric machine, in the case of a predetermined overall length it is necessary to design the machine with a number of turns adapted to said length. If the machine has, in particular, been constructed with a wave winding, the number of turns thereof is determined from a number of conductor portions guided within a groove—for example, a stator groove, that is to say, a stator slot—of the machine and also from a number of conductors connected in parallel connection in the wave winding, in accordance with the formula:

$$w = p \cdot q \cdot zn / a$$

where
w is the effective number of turns of the machine,
zn is the number of conductors per groove,
a is the number of conductors connected in parallel connection in the wave winding,
p is the number of pole pairs and
q is the number of holes of the machine.

The term "number of holes" describes the number of grooves, for example stator grooves, of the machine per magnetic pole and phase. Consequently, $$s = 2 \cdot p \cdot q \cdot r$$

where
s is the total number of stator grooves of the stator and
r is the number of phases—that is to say, the phase number—of the machine.

In one example, a stator with a total of 96 grooves, three phases and 16 poles—that is to say, 8 pole pairs—possesses a number of holes q=2. The term "hole" is therefore synonymous with "groove" or "stator groove".

Given a predetermined cross section of the groove, the number of conductor portions guided within a groove is inversely proportional to the conductor cross section of the conductor portions. However, a large conductor cross section results in increased frequency-dependent losses at high frequencies of the currents flowing through said conductor—that is to say, at high rotational speeds of the machine—by reason of the current displacement in the conductor in operation.

If, for example, 60 turns are to be produced, with p=10, q=2 and a=1, for example, it follows that zn=3—that is to say, three conductors are to be inserted into a groove. As a result, the cross section of an individual conductor and the frequency-dependent losses become large. Although in this example the number of conductors per groove could be doubled to zn=6 with q=1 and the cross section of the conductors could consequently be halved, the choice of the number of holes at q=1 has the disadvantage that harmonics arising in the machine are not suppressed, as a result of which increased losses and acoustic abnormalities—that is to say, increased operating noises—arise and, in addition, the torque ripple rises, which can likewise result in acoustic impairments.

By a setting of the structural design of the machine to a=1, the design scope for forming a desired number of turns is restricted. The variability of the machine is reduced; inter alia, the choice of possible configurations of the conductors is restricted. The requirements as regards torque and power of the machine cannot be satisfied, particularly within the range of high rotational speeds, by reason of the frequency-dependent losses associated with the large cross sections of the conductors. Therefore it is necessary to choose both the number of holes q and the number a of conductors connected in parallel connection in the wave winding to be greater than 1.

In the case of a machine with a wave winding in which several conductors have been connected to one another in parallel connection to form a phase, equalizing currents arise in the conductors of the parallel circuit in operation when voltages differing from one another are induced in the parallel conductors of a phase. This is the case, in particular, when the parallel conductors in the case of a number of holes q greater than 1 with respect to each pole have been arranged distributed to at least two adjacent grooves. The equalizing currents likewise result in losses.

SUMMARY OF THE INVENTION

The invention has the object of increasing power and efficiency in a machine of the type previously described by avoiding losses, particularly in the course of operation within the upper rotational-speed range.

This object is achieved by a wave winding for a stator of an electric machine, designed to be arranged in a series of stator grooves arranged along a periphery of the machine, said wave winding exhibiting with respect to a respective phase of the machine at least two conductors interconnected in parallel connection and/or series connection, which are capable of being arranged along the periphery of the machine with predetermined winding pitch in a predetermined sequence with respect to each phase and with respect to a respective magnetic pole in a number of at least two successive stator grooves of each magnetic pole and of each phase of the machine, and said predetermined sequence of at least the conductors interconnected in parallel connection having been transposed at least at one position along the periphery of the machine by at least one groove skip.

The stator grooves into which the wave winding designed in accordance with the invention is capable of being inserted have been oriented in this case in conventional manner at least largely in the axial direction of the machine—that is to say, transversely in relation to the peripheral direction thereof—and preferably distributed uniformly and therefore in rotationally symmetrical manner along the periphery of the machine. Although the description of the invention takes a rotating machine as its starting-point, the invention is likewise applicable to linear machines, in which case the described arrangement has then been formed in developed configuration. This is always implicitly encompassed by the following account of the invention. In a similar manner, the description of the invention takes an arrangement of the wave winding in the stator of the machine as its starting-point. However, an arrangement may also have been undertaken in corresponding manner in a rotor of a machine. This too is always implicitly encompassed by the following account of the invention.

For the connection of the conductors in parallel connection and/or series connection, different possibilities have been provided in accordance with the invention. If, for example, two conductors have been provided with respect to a respective phase of the machine, they may optionally have been connected to one another in series connection or in parallel connection. If, for example, four conductors are present with respect to a respective phase of the machine, they may have been connected to one another differently. Accordingly, all four conductors may have been connected parallel to one another. Additionally, in each instance two conductors may have been connected parallel to one another, and the two parallel circuits each consisting of two conductors may have been connected in series with respect to one another. In addition, it is possible to connect all four wires to one another in series connection. The invention is applicable in a particularly advantageous manner to the case where all the conductors of a phase have been connected in parallel with respect to one another.

The number of stator grooves of each magnetic pole and of each phase of the machine has been defined as the number of holes q thereof. The wave winding according to the invention is designed for a stator or a machine in which the number of holes q amounts to at least 2. The stator grooves with respect to each one of the magnetic poles and each one of the phases of the machine have been arranged along the periphery of the machine, immediately following one another. The conductors of a phase have been distributed to these stator grooves in a definite sequence; for example, a first one of these conductors has been arranged in a first one of these stator grooves, a second one of these conductors has been arranged in a second one of these stator grooves, etc. If more conductors a connected in parallel connection are present than stator grooves q with respect to a pole and a phase, in particular the following holds here:

$$a=N*q$$

where

N is a positive integer greater than 1—that is to say, N=2, 3, . . . , the occupancy of the successive stator grooves per pole and phase by the conductors, for example with a=4 and q=2—that is to say, N=2—is given as follows: a first one of the conductors has been arranged in the first one of the stator grooves, a second one of the conductors has been arranged in the second one of the stator grooves, a third one of the conductors has been arranged in the first one of the stator grooves, and a fourth one of the conductors has been arranged in the second one of the stator grooves.

The conductors of the wave winding have been wound with a predetermined winding pitch—that is to say, assigned to the stator grooves or distributed to the stator grooves. A spacing of two portions of each one of the conductors, guided successively through the stator grooves, is designated as the winding pitch. In this regard the winding pitch is optionally defined by the number of consecutively numbered stator grooves or by the number, increased by one, of stator grooves skipped in the course of winding. Phrased differently, the winding pitch is the number of stator grooves by which counting has to be continued in the course of winding until a stator groove is occupied by the same conductor. A winding pitch of, for example, 1:7 or 6 in the case of a conductor means that in a series of progressively numbered stator grooves a first and, following thereupon, a seventh, a thirteenth, etc. stator groove is occupied by the conductor—that is to say, every sixth stator groove.

The transposing, according to the invention, of the predetermined sequence of at least the conductors interconnected in parallel connection at least at one position along the periphery of the machine by at least one groove skip—that is to say, the transposing, according to the invention, of the sequence of occupancy of the stator grooves by the conductors—is now effected by changing the winding pitch of the conductors. For at least one of the conductors in this case the winding pitch is increased by a predetermined number of stator grooves—that is to say, groove spacings or spacings of each two immediately successive stator grooves—and for at least one further one of the conductors the winding pitch is decreased at the same place along the periphery of the machine by the same predetermined number of stator grooves. This transposing of the occupancy of the stator grooves by the conductors is designated as "groove skip". A transposing of such a type signifies, for example, that upstream of the groove skip a first one of the conductors has been arranged in a first one of the stator grooves per pole and phase, and a second one of the conductors has been arranged in a second one of the stator grooves per pole and phase, whereas downstream of the groove skip the first one of the conductors has been arranged in the second one of the stator grooves, and the second one of the conductors has been arranged in the first one of the stator grooves.

In the case of the wave winding according to the invention, the winding pitch of the conductors along the entire periphery of the machine has been predetermined congruently—that is to say, uniformly—and deviates only where the previously described sequence of occupancy of the stator grooves with the individual conductors has been transposed by the groove skip.

The finding underlying the invention is that the described equalizing currents are avoided if voltages matching one another are induced in all the conductors of a phase connected to one another in parallel connection. This is the case when all the conductors of a phase connected to one another in parallel connection are permeated by a magnetic flux that is equal in total. If, on the other hand, the conductors of a phase have all been arranged with continuously uniform winding pitch, the parts of a winding that are formed by them have been angularly offset overall with respect to one another along the periphery of the machine and, as a result, permeated by a magnetic flux deviating in accordance with the variation thereof along the periphery of the machine. Therefore differing voltages are induced.

The invention enables a wave winding for an electric machine to be created in straightforward manner that permits an operation of the machine with high power and increased efficiency also at high rotational speeds. In particular, losses as a result of equalizing currents are avoided, and a crucial reduction of electrical power losses caused by frequency-dependent current-displacement effects is achieved and a compact and simple structure of the machine is also obtained. At the same time the invention opens up a distinctly increased number of possibilities for the configuration and dimensioning of a machine of such a type, in particular by virtue of the fact that the design of a machine of such a type with a number of holes q of two and more is made possible.

Advantageous configurations of the invention are characterized in the dependent claims.

According to a preferred further development of the wave winding according to the invention, the at least one position of the at least one groove skip has been arranged distributed at least almost uniformly over an entire extent of the conductors. The entire extent—that is to say, the total length—of the conductors and preferably of each of the conductors is in this case subdivided by the groove skip into at least almost equally long portions, preferentially exactly equally long portions. Advantageously, several groove skips may also have been provided. In this case, the portions of the individual conductors subdivided by one or more groove skips, in which the occupancy of the stator grooves by the conductors has been provided in respectively differing sequence, have always been dimensioned in such a manner that for each conductor the number of portions having a first sequence of occupancy of the stator grooves is equal to the number of portions having a second sequence of occupancy of the stator grooves. Depending on the number of groove skips, in addition an unequal distribution of the groove skips may be possible or advantageous. Depending on the number a of conductors connected in parallel connection in the wave winding, and on the number of holes q of the machine, there may be more than two possibilities for the sequence of occupancy of the stator grooves, which permit further variations of the distribution of the groove skips or render such variations advantageous.

In a further preferred embodiment of the wave winding according to the invention, at least two portions, adjoining one another at least at one position of the at least one groove skip, of at least one of the conductors have been connected to one another by at least one contact means. In this embodiment, at least one of the conductors has been interrupted during manufacture at the position of at least one groove skip, and a connection by an electrical contact point has been made. This enables a uniform and homogeneous and therefore simplified production of the portions of the conductors. Only after the production thereof are the portions connected to one another so as to be electrically conducting, for example by welding, soldering, wedging or suchlike, in the manner according to the invention—that is to say, by carrying out the desired groove skip or groove skips. In a preferred example, a conductor in question can be wound continuously with the same—that is to say, constant—winding pitch, can be opened up at the position of the groove skip or at the positions of the groove skips, and can be connected again in transposed manner. By virtue of this configuration, the winding is simplified, but the contact points give rise to a certain additional expenditure in its manufacture and space requirement.

According to a further preferred embodiment of the wave winding according to the invention, at least two portions, adjoining one another at least at one position of the at least one groove skip, of at least one of the conductors have been integrally formed throughout. The portions have been wound integrally while carrying out the groove skip, and consist of a conductor structure extending in uninterrupted manner—that is to say, they extend continuously over and beyond the groove skip without interposition of a separate contact means. If, in accordance with this embodiment, winding is carried out continuously with alterations in the winding pitch at each groove skip while avoiding contact points there, then although the winding proves to be somewhat more elaborate than a winding with uniform winding pitch without groove skip the contact-point-free winding is more robust and less susceptible to manufacturing defects, in particular contact defects, and enables a more compact structure of the winding, since the conductors have a reduced space requirement at the positions of the groove skips as a result of the omission of separate contact points. Particularly preferably, all, or at least almost all, of the groove skips have been formed in accordance with this embodiment. Hence the wiring complexity of the winding can be reduced. The manufacturing operation, viewed overall, can also be simplified, and therefore the expenditure for means of manufacture that are needed can be reduced as a result of elimination of sorting, welding and isolating, for example by potting. In contrast, an additional expenditure for the winding with consideration of groove skips does not assume appreciable significance.

A further preferred configuration of the wave winding according to the invention is characterized by a design for use in a polyphase machine, in particular in a three-phase rotating-field machine. Here the invention enables, in quite particularly advantageous manner, an increase in power, torque and efficiency, particularly within the upper rotational-speed range, and hence, in particular, an increase in power when a polyphase machine of such a type is being utilized in a vehicle drive system, preferably in an auxiliary drive or traction drive of an internal-combustion vehicle, hybrid vehicle or electric vehicle, as well as in electric machines for other applications.

In a further advantageous embodiment of the wave winding according to the invention, the number of conductors with respect to each of the phases of the machine amounts to an integral multiple of, in particular at least double, a number of holes of the machine. As already mentioned above, the number of holes, denoted by q, is the number of stator grooves with respect to one pole and one phase, and with the number a of conductors connected in parallel connection with N=2, 3, etc. it accordingly holds that:

$$a = N * q$$

A preferred further development of the wave winding according to the invention is characterized by two or four or eight conductors, connected to one another in parallel connection, with respect to each of the phases of the machine—that is to say, a=2 or a=4, or a=8. It becomes evident that this enables a particularly favorable—that is to say, particularly advantageously adapted for traction drives of hybrid or electric vehicles, for example—simple and economic dimensioning of the wave winding. In particular, in the case of a complete winding of the conductors with a=8 a larger number of parallel conductors are employed with respect to each of the phases of the machine, without having to open up and reconnect the conductors in between; that is to say, the conductors can be integrally formed throughout. As a result, such points of separation and connection are avoided to a greater extent. The position of the conductors within the stator grooves can likewise be kept at least almost symmetrical. The option to design the phases of the machine with differing numbers of conductors connected to one another in parallel connection, in particular to design the phases of the machine optionally with, in each case, two, four or eight conductors, creates a greater variability of the winding layout of the machine with wave winding.

According to a further preferred embodiment of the wave winding according to the invention, at least one of the conductors has been formed with an at least almost rectangular conductor cross section. Hence a particularly high groove-filling factor is achieved—that is to say, a particularly high ratio of the sum of the conductor cross sections of conductors capable of being arranged in a respective stator groove to the total cross-sectional area of the stator groove. This enables a high power density in the electric machine and hence a further increase in power as well as a more compact structural shape.

The aforementioned object is achieved, furthermore, by a stator for an electric machine, in particular for a polyphase machine, characterized by a wave winding of the type previously described.

A stator designed in such a manner has been constructed, in simplified manner in terms of manufacturing, to be more compact, more robust and simpler. In the case of a design with continuous winding at the positions of the groove skips, a stator configured in such a manner has, in addition, been constructed to be particularly space-saving and functionally reliable.

The aforementioned object is achieved, in addition, by an electric machine, in particular a polyphase machine, characterized by a wave winding of the type previously described and/or by a stator of the type previously described.

The machine according to the invention enables an increase in efficiency and also in the power capable of being output, particularly within the upper rotational-speed range, and at the same time is particularly compact and robust and has a reduced susceptibility to faults.

In other words, in accordance with the invention a wave winding for a stator, exhibiting a number of phases, of an electric motor or electric generator is created overall which exhibits for each phase at least two conductors, also designated as winding wires, which have been guided through corresponding stator grooves. The conductors have preferably been realized in interruption-free manner. In a preferred embodiment, after a half-winding—that is to say, in the middle of their entire extent—the conductors exhibit swapped positions in the associated stator groove by reason of a crossed line routing, as a result of which undesirable induced voltages of the conductors can be prevented in simple manner and preferentially while avoiding separate contact connections, for example welded joints.

BRIEF DESCRIPTION OF THE DRAWINGS

Exemplary embodiments of the invention are represented in the drawing and will be described in more detail in the following, wherein matching elements in all the figures have been provided with the same reference symbols and a repeated description of these elements will be dispensed with. Shown are.

PREFERRED EMBODIMENT OF THE INVENTION

Figure 1:
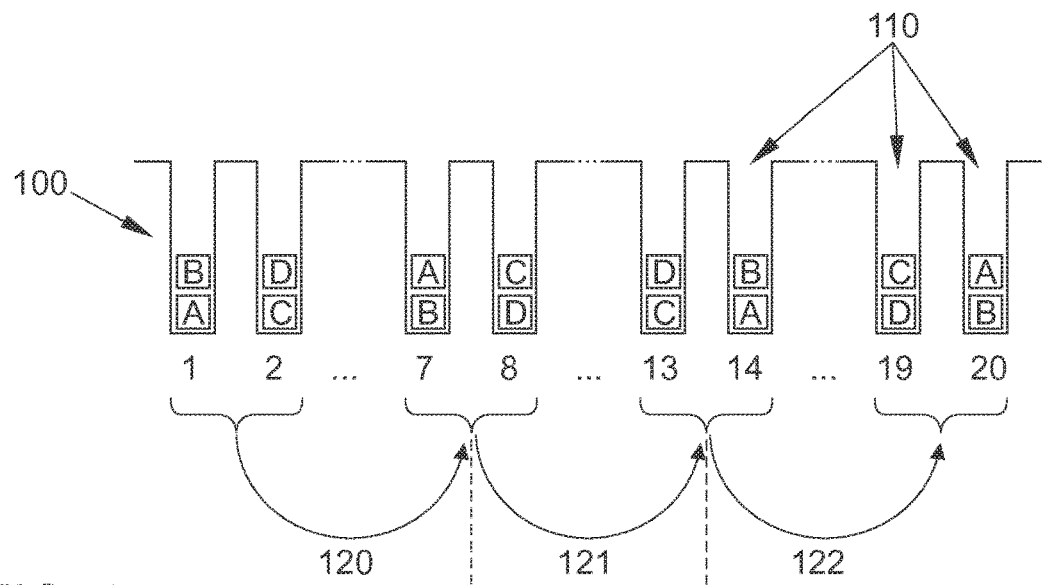
FIG. 1 a roughly schematic representation of a winding scheme of an exemplary embodiment of a wave winding according to the invention, FIG. 2 a circuit diagram for representing the connection of the conductors of the wave winding of the exemplary embodiment according to FIG. 1, FIG. 3 a schematic representation of temporal progressions of differing voltages induced in conductors, arranged in stator grooves adjacent to one another, of a phase of a wave winding constructed without a groove skip, FIG. 4 a schematic representation of a wave winding with a winding scheme of the exemplary embodiment according to FIG. 1, FIG. 5 a schematic, perspective representation of two conductors of the wave winding according to FIG. 4 at the position of a groove skip, FIG. 6 a modification of the exemplary embodiment according to FIGS. 4 and 5, FIG. 7 a roughly schematic representation of a winding scheme of a second exemplary embodiment of a wave winding according to the invention as a modification of the exemplary embodiment according to FIG. 1 and FIG. 8 a circuit diagram for representing the connection of the conductors of the wave winding of the second exemplary embodiment according to FIG. 7.

In FIG. 1 a detail of a series of stator grooves of an electric machine is represented roughly schematically in a cross-sectional view, for the sake of simplicity in a developed view. The stator grooves are arranged along a periphery of the machine, are denoted by the reference symbol 110, and are consecutively numbered in their sequence in exemplary manner with 1, 2, .... Conductors of a wave winding 100 are arranged in the stator grooves 110. These conductors have been connected in fours, parallel to one another, per phase of the machine. For the sake of clarity, only the conductors of one of the phases, and, of these, also only one respective layer in each of the stator grooves represented have been reproduced and denoted by A, B, C and D. Conductors A, B, C, D have preferably been formed with a rectangular conductor cross section, so that a high groove-filling factor is achieved. Conductors A, B, C, D electrically connected to one another in parallel have been represented with predetermined winding pitch in a sequence, predetermined with respect to each phase and with respect to a respective magnetic pole, along the periphery of the machine so as to be capable of being arranged in a number of at least two successive stator grooves 110 of a respective magnetic pole and of a respective phase of the machine and, for the sake of clarity in FIG. 1, also arranged in these stator grooves 110. In the exemplary embodiment according to FIG. 1, the number of successive stator grooves 110 of a respective magnetic pole and of a respective phase of the machine is equal to 2—that is to say, the four conductors A, B, C, D electrically connected to one another in parallel have been arranged distributed to, per pole and phase, two successive stator grooves 110 along the periphery of the machine. This arrangement is made in a predetermined sequence in such a manner that conductors A and B have been arranged in the first of the two successive stator grooves 110 and conductors C and D have been arranged in the second of the two successive stator grooves 110. The wave winding 100, and therefore the machine of the present exemplary embodiment, is of three-phase design. Hence conductors A, B, C, D have been guided through every sixth stator groove 110—that is to say, with a winding pitch of 6 or 1:7. This winding pitch is denoted in FIG. 1 by an arrow 120. Consequently this results in an occupancy of the stator grooves 110 having numbers 1 and 7 by conductors A, B and an occupancy of the stator grooves 110 having numbers 2 and 8 by conductors C, D. Without a groove skip according to the invention, described in the following, there would also continue to result an occupancy of the further stator grooves 110 having numbers 13, 19, . . . by conductors A, B and an occupancy of the stator grooves 110 having numbers 14, 20, . . . by conductors C, D—that is to say, along the entire perimeter of the electric machine and hence along the entire extent of the wave winding 100.

In accordance with the invention, however, this predetermined sequence of conductors A, B, C, D at a position along the periphery of the machine has been transposed by a groove skip. This groove skip has been designed in FIG. 1 in such a manner that conductors A, B have been guided from the stator groove 110 having number 7 to the stator groove 110 having number 14 and through the latter, whereas conductors C, D have been guided from the stator groove 110 having number 8 to the stator groove 110 having number 13 and through the latter. Hence for conductors A, B at this position of the groove skip a winding pitch increased by 1, of 7 or 1:8, has been undertaken; for conductors C, D, on the other hand, a winding pitch decreased by 1, of 5 or 1:6, has been undertaken. These modified winding pitches are denoted in FIG. 1 by an arrow 121. As a consequence of this, the predetermined sequence of conductors A, B, C, D per magnetic pole and phase has been transposed in such a manner that, from this position on, conductors C and D have been arranged in the first of the two successive stator grooves 110 having number 13, and conductors A and B have been arranged in the second of the two successive stator grooves 110 having number 14. Since, from this position on, the winding pitch for all conductors A, B, C, D again amounts congruently to 6 or 1:7, denoted by an arrow 122, this transposed sequence is also preserved for the stator grooves 110 having numbers 19, 20, . . . .

Figure 2:
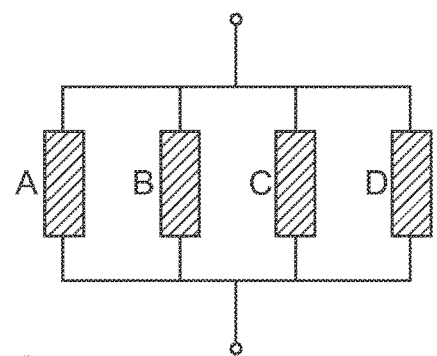

FIG. 2 shows a schematic electrical circuit diagram of conductors A, B, C, D, connected to one another in parallel connection, of a phase of the wave winding 100.

Figure 3:
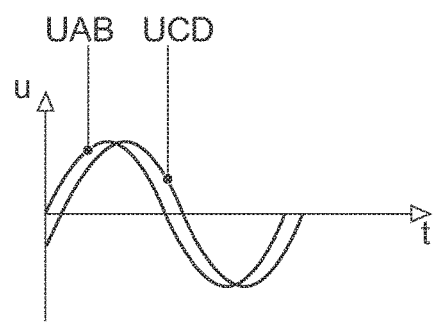

FIG. 3 shows a schematic representation of temporal progressions of differing voltages u induced in conductors A, B, C, D, arranged in stator grooves 110 adjacent to one another, of a phase of a wave winding constructed without a groove skip. In this figure a voltage induced in conductors A and B is denoted by UAB, and a voltage induced in conductors C and D is denoted by UCD. The time is denoted by t. The induced voltages UAB and UCD are composed additively of individual voltages which are induced in a respective portion of conductors A, B, C, D in each one of the stator grooves 110, and have been temporally displaced with respect to one another in accordance with a speed of motion of the machine along the periphery—that is to say, a peripheral speed or rotary speed—and a spacing of the stator grooves 110 along the periphery temporally with respect to one another. As a result, a differential AC voltage arises between the ends of conductors A, B, on the one hand, and those of conductors C, D, on the other hand, which gives rise to equalizing currents through conductors A, B, C, D. These currents result in losses and in the diminution of the efficiency of the machine. By virtue of the invention, one half of these individual voltages that are induced in a respective portion of conductors A, B in each one of the stator grooves 110 is transposed in its temporal sequence—that is to say, displacement—with respect to one half of the individual voltages that are induced in a respective portion of conductors C, D in each one of the stator grooves 110. Therefore in the sum of all these individual voltages the temporal displacements cancel each other out and the temporal progressions of the voltages UAB and UCD tally. Hence no equalizing currents arise any longer.

Figure 4:
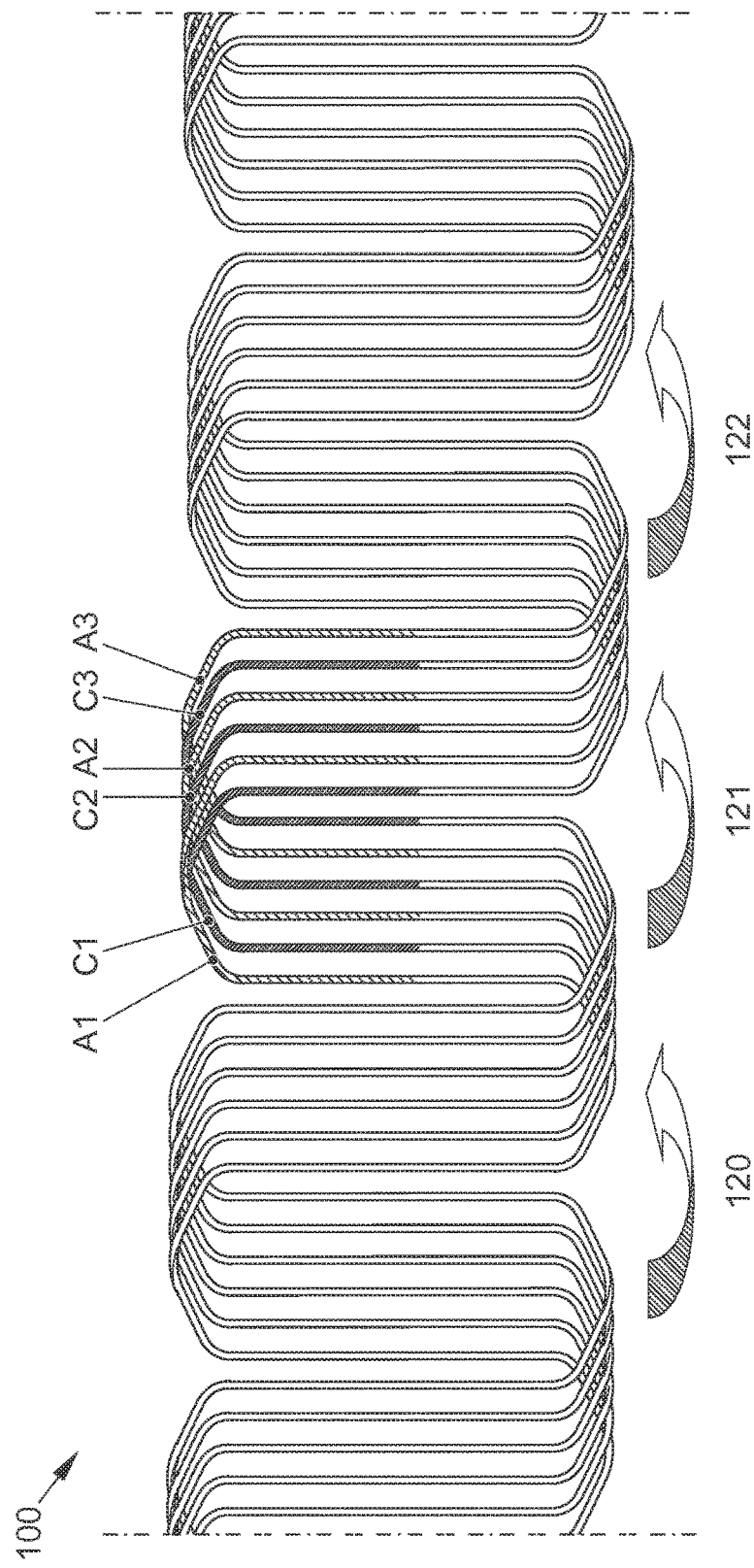

In FIG. 4 a schematic representation of the wave winding 100 with a winding scheme of the exemplary embodiment according to FIG. 1 is reproduced as a developed view in a top view. For the sake of clarity in this case, with respect to a total of three phases per two parallel conductors and, of these, only one respective portion per stator groove 110—that is to say, only one respective winding layer—have been represented, which correspond to conductors A and C from FIG. 1 and for the three phases are accordingly denoted by A1, A2, A3 and C1, C2, C3, respectively. The same winding scheme also results, moreover, for a winding with two conductors electrically connected to one another in parallel, which have been arranged distributed to, per pole and phase, two successive stator grooves 110 along the periphery of the machine. The winding pitch of 6 or 1:7, denoted by arrows 120 and 122, has also been altered here at the position of the groove skip to 5 or 1:6 for conductors C1, C2, C3, and to 7 or 1:8 for conductors A1, A2, A3, denoted by arrow 121, as a result of which the sequence of conductors A1, C1 and A2, C2 and A3, C3 in the occupancy of the stator grooves has been transposed at the position of the groove skip.

Figure 5:
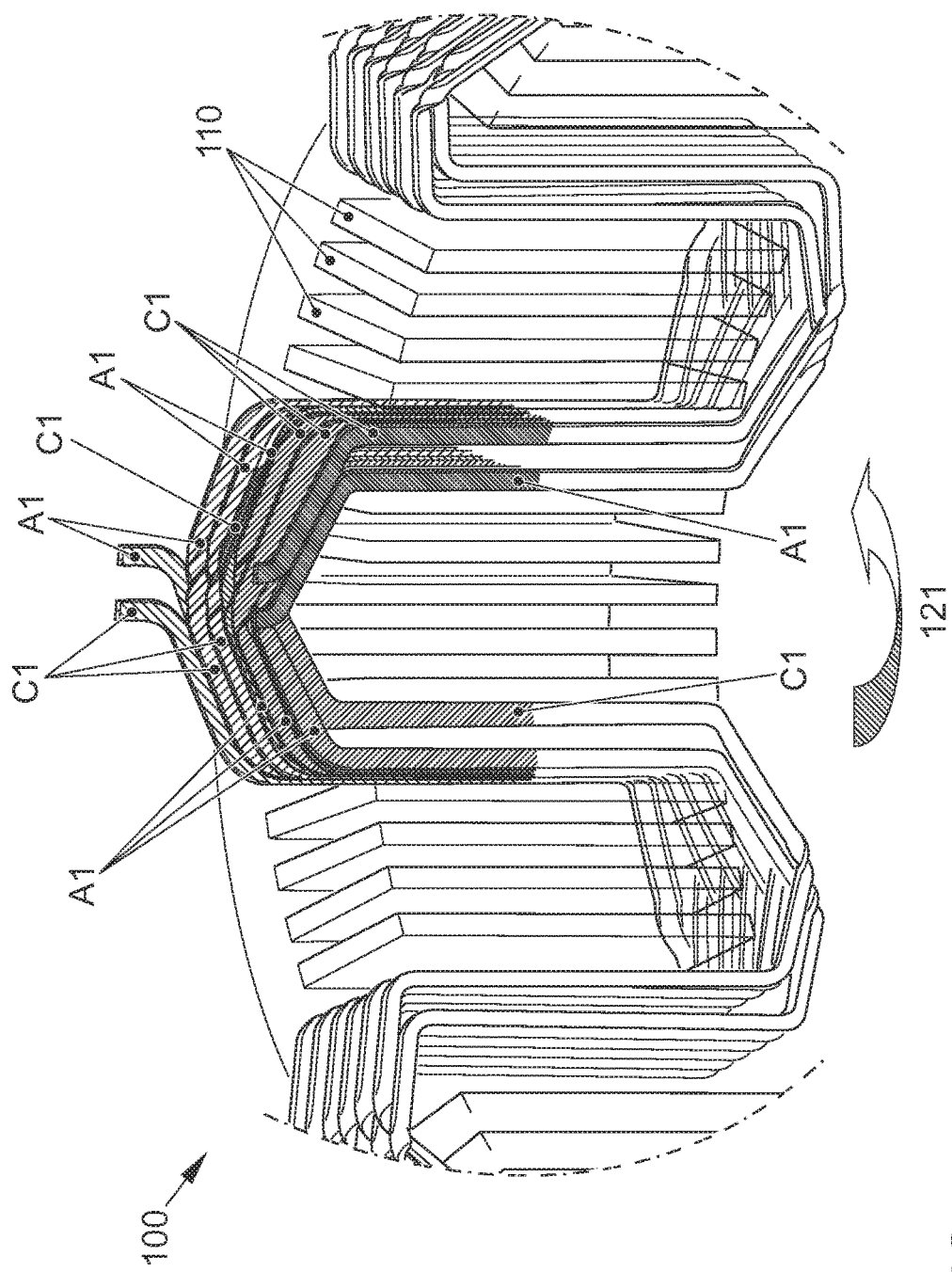

FIG. 5 shows a schematic, perspective representation of all the winding layers of conductors A1, C1 of the wave winding according to FIG. 4 at the position of the groove skip. Represented, in addition, is the occupancy of the stator grooves 110 by conductors A1, C1. Conductors A1, C1 have been guided around the entire stator of the machine a total of six times, so that each stator groove is occupied by six portions of the conductors. Only the occupancy of the stator grooves in question by, in each case, six portions of conductors A1 and C1 is represented here. A groove skip, indicated by arrow 121, has been provided after threefold guidance of conductors A1, C1 around the entire stator of the machine—that is to say, at half the extent of conductors A1, C1. In this case, conductors A1, C1 have been wound continuously—that is to say, in a manner free from interruption—without separate contact means along their entire extent. Conductor C1 has been guided with winding pitch of 5 or 1:6 at the position of the groove skip at the winding head in an arc within an arc formed there by conductor A1 with winding pitch of 7 or 1:8. As a result, a very space-saving design of the winding head is obtained also at the position of the groove skip. Moreover, conductors A1, C1 have been arranged with a winding pitch of 6 or 1:7 and in this case have been wrapped around one another—that is to say, folded over—in the region of the winding head with a half-rotation around their longitudinal extent. A very space-saving design of the winding head is also achieved by this means. In the case of this design of the wave winding 100, merely end contacts of conductors A1, C1—and, correspondingly, end contacts, not represented in FIG. 5, of conductors of other phases—have been guided out of the wave winding 100. Overall, this results in a continuously wound wave winding having reduced construction space, saving contact points.

Figure 6:
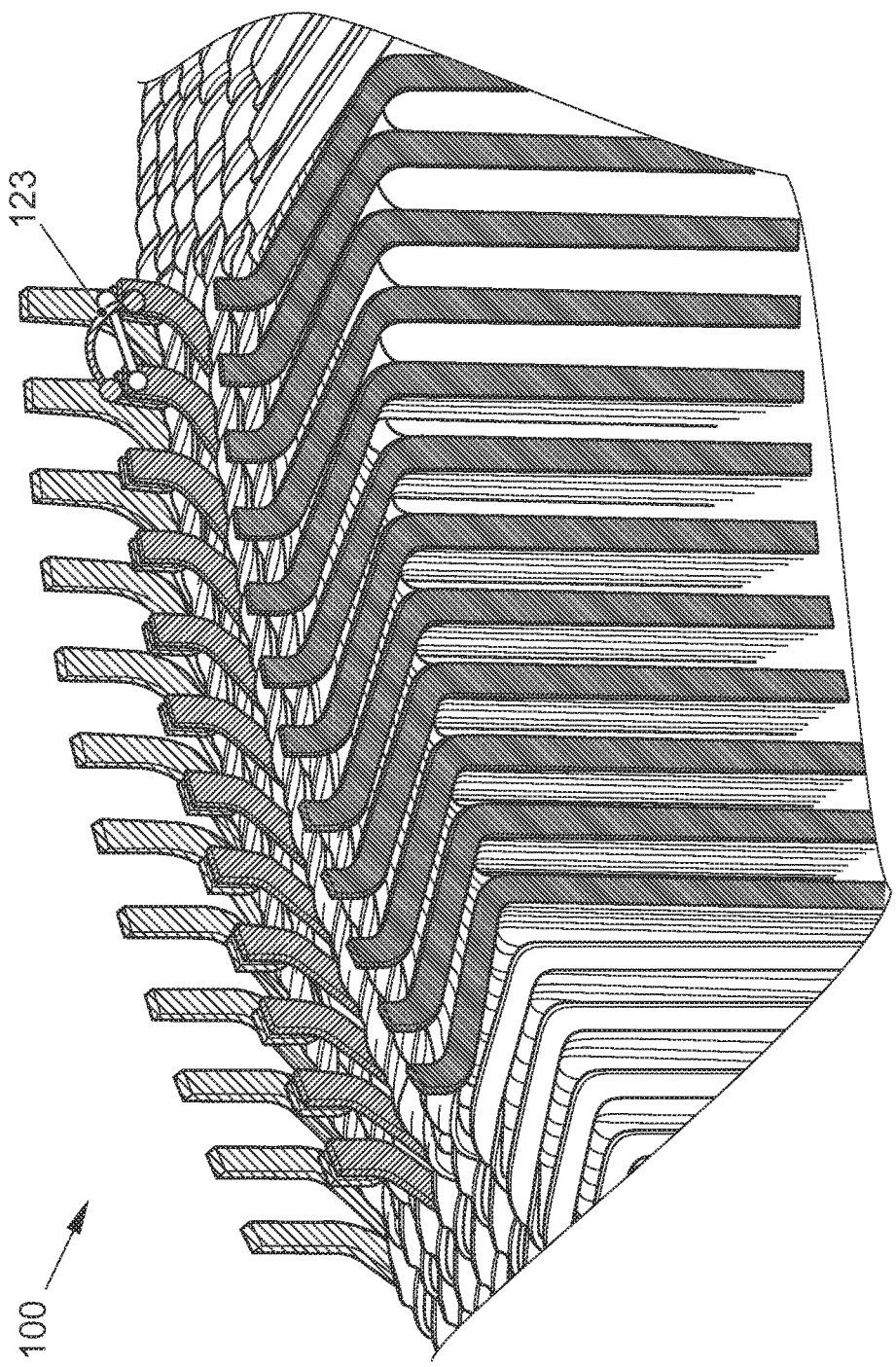

FIG. 6 shows, in a modification of the exemplary embodiment according to FIGS. 4 and 5, a detail from a wave winding 100 with a representation of all the conductors at the position of the groove skip. In contrast to the configuration shown in FIGS. 4 and 5, here for the purpose of forming the altered winding pitches at the position of the groove skip the conductors have been interrupted at one half of their entire extent, and their ends formed by these interruptions have been guided out of the winding head. In the representation shown in FIG. 6, these guided-out ends face one another in pairs at the interruptions of the conductors. The transposition of the sequence of occupancy of the stator grooves 110 by the conductors is to be undertaken by connecting the ends of the conductors formed by these interruptions in pairs crosswise, as symbolized by a connection indicated in exemplary manner and denoted by reference symbol 123.

Figure 7:
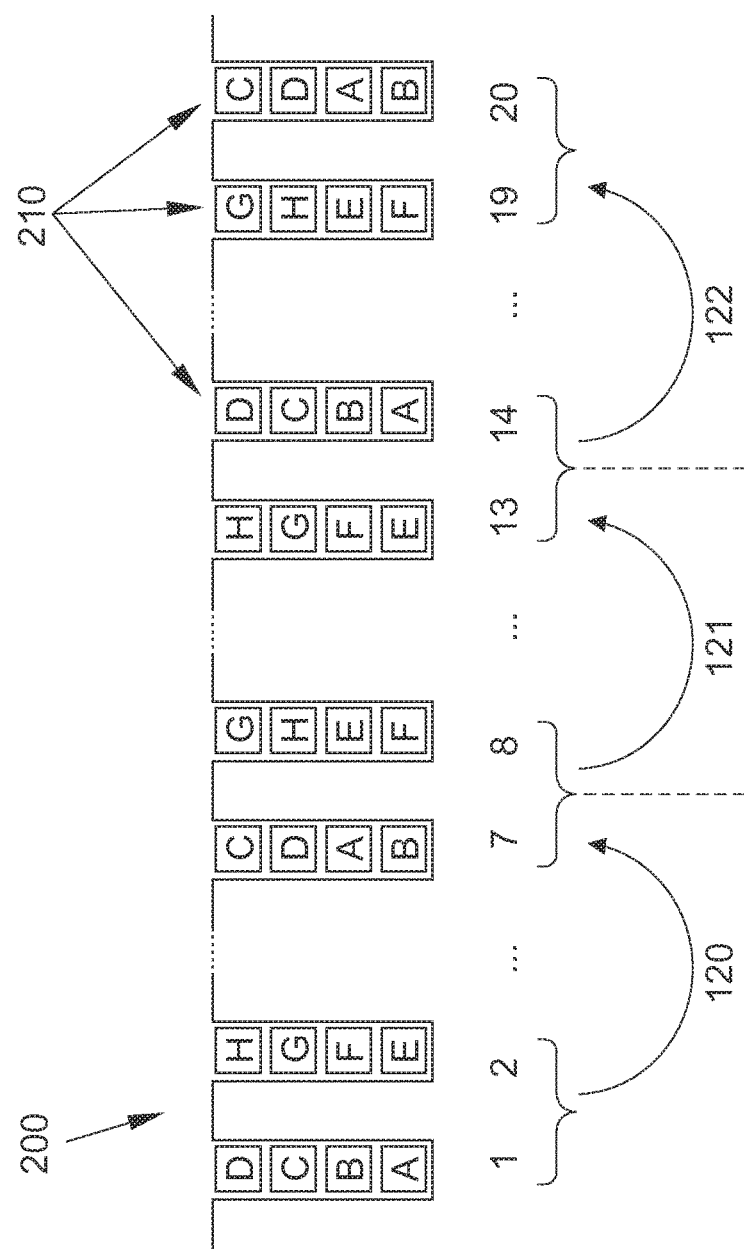

In FIG. 7, which shows, in the same manner of representation as FIG. 1, a roughly schematic reproduction of a winding scheme of a second exemplary embodiment of a wave winding according to the invention as a modification of the exemplary embodiment according to FIG. 1, a detail of a series of stator grooves of an electric machine is represented, for the sake of simplicity, in a developed view roughly schematically in a cross-sectional view. The stator grooves are arranged along a periphery of the machine, are denoted by reference symbol 210, and are numbered consecutively in their sequence in exemplary manner with 1, 2, . . . . Conductors of a wave winding 200 have been arranged in the stator grooves 210. These conductors have been connected to one another in parallel in eights per phase of the machine. For the sake of clarity, only the conductors of one of the phases and, of these, also only one respective layer in each of the stator grooves have been reproduced and denoted by A, B, C, D, E, F, G and H. The conductors A, B, C, D, E, F, G, H have preferably been formed with rectangular conductor cross section, so that a high groove-filling factor is achieved. The conductors A, B, C, D, E, F, G, H electrically connected to one another in parallel are capable of being arranged with predetermined winding pitch in a predetermined sequence with respect to each phase and with respect to a respective magnetic pole along the periphery of the machine in a number of at least two successive stator grooves 210 of each magnetic pole and of each phase of the machine, and for the sake of clarity are represented in FIG. 7 also arranged in these stator grooves 210.

In the second exemplary embodiment according to FIG. 7, the number of successive stator grooves 210 of a respective magnetic pole and of a respective phase of the machine is equal to 2—that is to say, the eight conductors A, B, C, D, E, F, G, H electrically connected to one another in parallel have been arranged distributed to, per pole and phase, two successive stator grooves 210 along the periphery of the machine. This arrangement is effected in a predetermined sequence in such a manner that conductors A, B, C and D have been arranged in the first of the two successive stator grooves 210 and conductors E, F, G and H have been arranged in the second of the two successive stator grooves 210. The wave winding 200 and hence the machine also of the second exemplary embodiment is of three-phase design. Hence conductors A, B, C, D, E, F, G, H have been guided through every sixth stator groove 210—that is to say, with a winding pitch of 6 or 1:7. This winding pitch is again denoted by an arrow 120 in FIG. 7. Consequently this results in an occupancy of the stator grooves 210 having numbers 1 and 7 by conductors A, B, C, D and an occupancy of the stator grooves 210 having numbers 2 and 8 by conductors E, F, G, H. Without a groove skip according to the invention, described in the following, there would also continue to result an occupancy of the further stator grooves 210 having numbers 13, 19, . . . by conductors A, B, C, D and an occupancy of the stator grooves 210 having numbers 14, 20, . . . by conductors E, F, G, H—that is to say, along the entire perimeter of the electric machine and hence along the entire extent of the wave winding 200.

In accordance with the invention, however, also in the case of the second exemplary embodiment this predetermined sequence of the conductors A, B, C, D, E, F, G, H has been transposed by a groove skip at a position along the periphery of the machine. This groove skip has been designed in FIG. 7 in such a manner that conductors A, B, C, D have been guided from the stator groove 210 having number 7 to the stator groove 210 having number 14 and through the latter, whereas conductors E, F, G, H have been guided from the stator groove 210 having number 8 to the stator groove 210 having number 13 and through the latter. Hence for conductors A, B, C, D at this position of the groove skip a winding pitch increased by 1, of 7 or 1:8, has been undertaken; for conductors E, F, G, H, on the other hand, a winding pitch decreased by 1, of 5 or 1:6, has been undertaken. These modified winding pitches are denoted in FIG. 7 by an arrow 121. As a consequence of this, the predetermined sequence of the conductors A, B, C, D, E, F, G, H per magnetic pole and phase has been transposed in such a manner that, from this position on, conductors E, F, G, H have been arranged in the first of the two successive stator grooves 210 having number 13 and conductors A, B, C, D have been arranged in the second of the two successive stator grooves 210 having number 14. Since, from this position on, for all the conductors A, B, C, D, E, F, G, H the winding pitch again amounts congruently to 6 or 1:7, denoted by an arrow 122, this transposed sequence is also preserved for the stator grooves 210 having numbers 19, 20, . . . .

Figure 8:
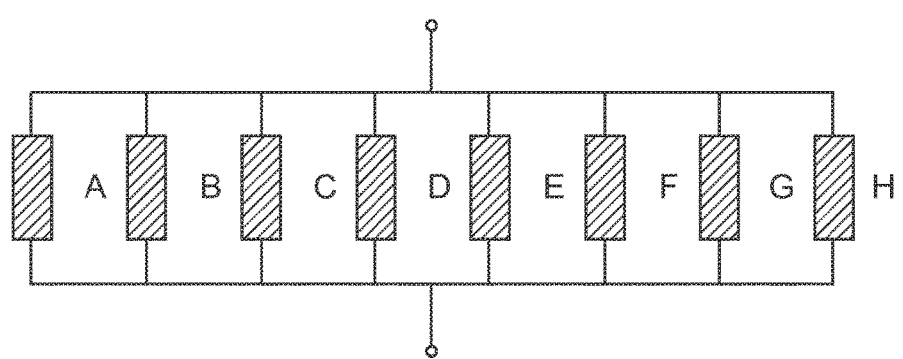

FIG. 8 shows a schematic electrical circuit diagram of the conductors A, B, C, D, E, F, G, H, connected to one another in parallel connection, of a phase of the wave winding 200 of the second exemplary embodiment according to FIG. 7.

By virtue of the invention, a new scheme is consequently described for introducing the conductors of a wave winding into the stator grooves. In this connection, particularly in the case of the embodiment according to FIGS. 1 and 2, a so-called mat of conductors with two superposed conductors A, B and C, D, respectively, is introduced into the stator grooves 110. In the case of the embodiment according to FIGS. 7 and 8, on the other hand, a mat of conductors with four superposed conductors A, B, C, D and E, F, G, H, respectively, is inserted into the stator grooves 210.

LIST OF REFERENCE SYMBOLS 100 wave winding
110 stator grooves, numbered consecutively with 1, 2, . . .
120 arrow, denotes winding pitch of 6 or 1:7
121 arrow, denotes winding pitch of 7 or 1:8 for conductors A, B and 5 or 1:6 for conductors C, D
122 arrow, denotes winding pitch of 6 or 1:7
123 connection of conductors at the groove skip
200 wave winding
210 stator grooves, numbered consecutively with 1, 2, . . .
A conductor
B conductor
C conductor
D conductor
E conductor
F conductor
G conductor
H conductor
A1 conductor
A2 conductor
A3 conductor
C1 conductor
C2 conductor
C3 conductor
t time
u voltage
UAB voltage induced in conductors A and B
UCD voltage induced in conductors C and D

The invention claimed is:

1. A wave winding for a stator of an electric machine to be disposed in a series of stator grooves disposed along a periphery of the machine, the wave winding comprising:
at least two conductors interconnected in at least one of a parallel connection or a series connection with respect to a respective phase of the machine;
said at least two conductors being configured to be disposed with a predetermined winding pitch in a sequence predetermined with respect to each phase and with respect to a respective magnetic pole along the periphery of the machine in a number of at least two successive stator grooves of each magnetic pole and of each phase of the machine; and
said predetermined sequence of at least said conductors interconnected in said parallel connection being transposed by at least one groove skip at least at one position along the periphery of the machine.

2. The wave winding according to claim 1, wherein said at least one position of said at least one groove skip is distributed at least approximately uniformly over an entire extent of said conductors.

3. The wave winding according to claim 1, wherein at least two portions, adjoining one another at least at one position of said at least one groove skip, of at least one of said conductors are connected to one another by at least one contact.

4. The wave winding according to claim 1, wherein at least two portions, adjoining one another at least at one position of said at least one groove skip, of at least one of said conductors are integrally formed throughout.

5. The wave winding according to claim 1, wherein the wave winding is configured for use in a polyphase machine.

6. The wave winding according to claim 1, wherein the wave winding is configured for use in a three-phase rotating-field machine.

7. The wave winding according to claim 1, wherein said number of conductors with respect to each of the phases of the machine amounts to an integral multiple of a number of holes of the machine.

8. The wave winding according to claim 7, wherein the integral multiple is at least double.

9. The wave winding according to claim 1, wherein said conductors include two or four or eight conductors connected to one another in a parallel connection with respect to each of the phases of the machine.

10. The wave winding according to claim 1, wherein at least one of said conductors has an at least approximately rectangular conductor cross section.

11. A stator for an electric machine or for a polyphase machine, the stator comprising a wave winding according to claim 1.

12. An electric machine or a polyphase machine, comprising a wave winding according to claim 1.

13. An electric machine or a polyphase machine, comprising a stator having a wave winding according to claim 1.

* * * * *